United States Patent
Lo et al.

(10) Patent No.: US 10,150,279 B2
(45) Date of Patent: Dec. 11, 2018

(54) PANEL LAMINATING METHOD, PANEL ASSEMBLY AND ELECTRONIC DEVICE

(71) Applicant: HTC Corporation, Taoyuan County (TW)

(72) Inventors: Chu-Chun Lo, Taoyuan County (TW); Hung-Wei Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 65 days.

(21) Appl. No.: 14/174,845

(22) Filed: Feb. 7, 2014

(65) Prior Publication Data

US 2015/0230361 A1    Aug. 13, 2015

(51) Int. Cl.
| | |
|---|---|
| *B32B 38/00* | (2006.01) |
| *B32B 7/12* | (2006.01) |
| *B32B 37/12* | (2006.01) |
| *B32B 37/18* | (2006.01) |
| *B32B 37/00* | (2006.01) |

(52) U.S. Cl.
CPC ............ *B32B 38/0008* (2013.01); *B32B 7/12* (2013.01); *B32B 37/1284* (2013.01); *B32B 37/18* (2013.01); *B32B 37/003* (2013.01); *B32B 2037/1253* (2013.01); *B32B 2250/02* (2013.01); *B32B 2307/412* (2013.01); *B32B 2310/0831* (2013.01); *B32B 2457/00* (2013.01); *B32B 2457/202* (2013.01); *Y10T 156/10* (2015.01); *Y10T 428/24752* (2015.01)

(58) Field of Classification Search
CPC ...... H05K 7/1427; B32B 7/12; B32B 38/0008
See application file for complete search history.

(56) References Cited

U.S. PATENT DOCUMENTS

2008/0153377 A1* 6/2008 Kobayashi ........ G02F 1/133308
445/24
2010/0277684 A1* 11/2010 Fukushima ......... H01L 51/5237
349/158
(Continued)

FOREIGN PATENT DOCUMENTS

| CN | 102426494 | 4/2012 |
|---|---|---|
| CN | 102501560 | 6/2012 |

(Continued)

OTHER PUBLICATIONS

"Office Action of Taiwan Counterpart Application", dated Oct. 12, 2015, p. 1-p. 7.
(Continued)

*Primary Examiner* — Daniel McNally
(74) *Attorney, Agent, or Firm* — JCIPRNET (57) ABSTRACT

A panel laminating method is provided with the following steps. A transparent adhesive layer is formed on a first panel. At least a portion of the transparent adhesive layer is pre-cured to increase the viscosity of the transparent adhesive layer. After the transparent adhesive layer is pre-cured, a second panel is stacked on the transparent adhesive layer. After the second panel is stacked on the transparent adhesive layer, the entire of the transparent adhesive layer is main-cured so that the second panel is laminated to the first panel through the transparent adhesive layer. Besides, a panel assembly and an electronic device are also provided.

6 Claims, 7 Drawing Sheets (56) References Cited

U.S. PATENT DOCUMENTS

| | | | |
|---|---|---|---|
| 2011/0177261 A1* | 7/2011 | Ishii | G02F 1/133308 |
| | | | 428/1.5 |
| 2012/0026102 A1* | 2/2012 | Chang | G06F 3/041 |
| | | | 345/173 |
| 2012/0298285 A1* | 11/2012 | Kurimuru | G02F 1/1303 |
| | | | 156/64 |
| 2013/0000822 A1 | 1/2013 | Kim et al. | |
| 2014/0069581 A1* | 3/2014 | Ogawa | G02F 1/1303 |
| | | | 156/275.5 |

FOREIGN PATENT DOCUMENTS

| | | | |
|---|---|---|---|
| CN | 103552354 | 2/2014 | |
| JP | 4549299 | 9/2010 | |
| JP | 2012071281 A * | 4/2012 | |
| JP | WO 2013111810 A1 * | 8/2013 | G02F 1/1303 |
| TW | 201337704 | 9/2013 | |
| TW | 201348377 | 12/2013 | |
| TW | 201402753 | 1/2014 | |

OTHER PUBLICATIONS

"Office Action of China Counterpart Application", dated Jun. 2, 2016, p. 1-p. 8.

* cited by examiner

PANEL LAMINATING METHOD, PANEL ASSEMBLY AND ELECTRONIC DEVICE

BACKGROUND OF THE INVENTION

Field of the Invention

The application relates to a panel laminating method, and more particularly, to a method for laminating two panels with each other and a panel assembly using the same.

Description of Related Art

Since handheld touch devices, such as smart phones and tablet computers, have characteristics of multiple functions and convenience to carry, etc., this kind of handheld devices has become relatively popular to consumers. The handheld touch devices are usually equipped with a display panel to display an image and equipped with a touch panel on the display panel, so as to input commands in corporation with the image displayed by the display panel.

Conventionally, in order to laminate the touch panel onto the display panel, a dam is firstly formed on the display panel to define distribution regions of liquid optical clear adhesive (LOCA). Subsequently, the liquid optical clear adhesive is coated on the area surrounded by the dam on the display panel, so as to form a transparent adhesive layer. Afterwards, the touch panel is stacked on the dam and the transparent adhesive layer, and then the transparent adhesive layer is cured through irradiating ultraviolet light. As such, the touch panel is laminated onto the display panel via the cured transparent adhesive layer.

However, the material of the dam has to employ a liquid optical clear adhesive with high viscosity which is not easy to deaerate and to coat, thereby increasing the complexity of manufacture. In addition, the dam has to be disposed between the periphery of the display panel and the active display area of the display panel, such that it is unfavourable to narrow the border of the handheld touch device. Furthermore, the flowability of the transparent adhesive layer remains before curing, so that the un-cured transparent adhesive layer may overflow out of the dam due to any movement or sway. As such, additional cleaning procedures are required, resulting in difficulties on the automated production.

SUMMARY OF THE INVENTION

The application is directed to a panel laminating method, which may omit the conventional dam and is facilitated to simplify the complexity of manufacture.

The application is directed to a panel assembly, which may omit the conventional dam and is facilitated to narrow the border.

The application provides a panel laminating method which includes the following steps. A transparent adhesive layer is formed on a first panel. At least a portion of the transparent adhesive layer is pre-cured so as to increase the viscosity of the transparent adhesive layer. After the transparent adhesive layer is pre-cured, a second panel is stacked on the transparent adhesive layer. After the second panel is stacked on the transparent adhesive layer, the entire of the transparent adhesive layer is main-cured so that the second panel is laminated to the first panel through the transparent adhesive layer.

The application provides a panel assembly, which includes a first panel, a transparent adhesive layer and a second panel. The transparent adhesive layer is disposed on the first panel. The second panel is disposed on the transparent adhesive layer so as to be laminated to the first panel through the transparent adhesive layer. The transparent adhesive layer is isotropic, and the periphery of the transparent adhesive layer is substantially bared.

The application provides an electronic device, which includes a chassis and the afore-described panel assembly.

According to the foregoing, in the application, after the liquid optical clear adhesive is coated on the first panel to form a transparent adhesive layer, the transparent adhesive layer is immediately irradiated by the ultraviolet light to decrease the flowability of the transparent adhesive layer, such that the conventional dam configured to prevent the overflow of the paste can be omitted, and simultaneously the un-cured transparent adhesive layer can be prevented overflowing to other areas. In addition, the application is capable of reducing the complexity of manufacture through the absence of the conventional dam, which is facilitated to narrow the border design.

In order to make the aforementioned features and advantages of the application more comprehensible, several embodiments accompanied with figures are described in detail below.

DETAILED DESCRIPTION OF DISCLOSED EMBODIMENTS

Figure 1:
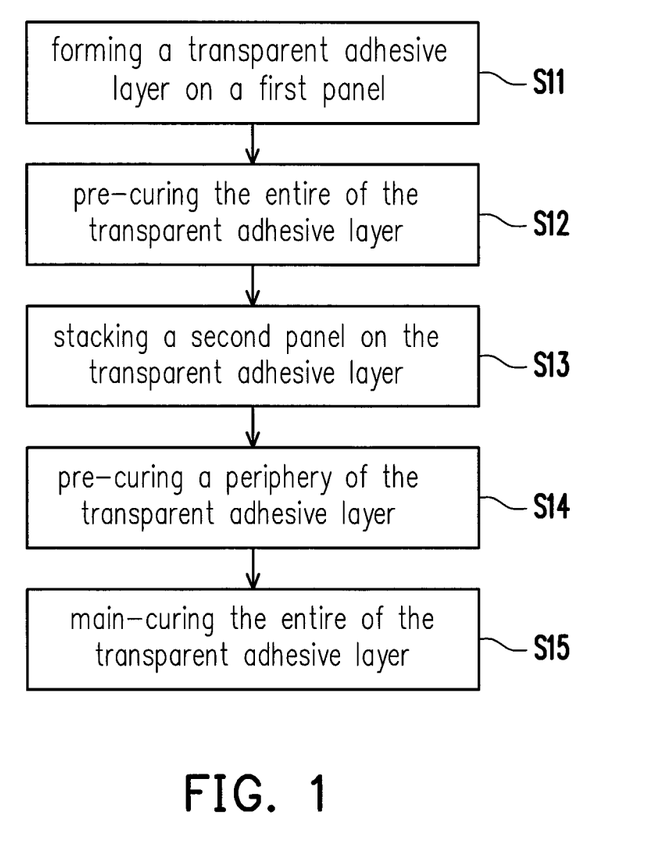
FIG. 1 is a flowchart illustrating a panel laminating method according to an embodiment of the application.
Figure 2A:
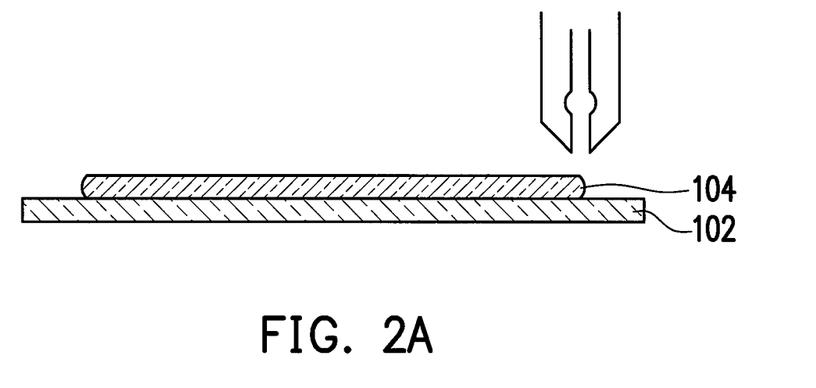
FIG. 2A through FIG. 2E are cross-sectional views sequentially illustrating steps of the panel laminating method depicted in FIG. 1.

FIG. 1 is a flowchart illustrating a panel laminating method according to an embodiment of the application. FIG. 2A through FIG. 2E are cross-sectional views sequentially illustrating steps of the panel laminating method depicted in FIG. 1. Referring to FIG. 1 and FIG. 2A, Step S11 is performed, a transparent adhesive layer 104 is formed on a first panel 102. In Step S11, a liquid optical clear adhesive (LOCA) may be coated on the first panel 102 to form the transparent adhesive layer 104, as shown in FIG. 2A.

Figure 2B:
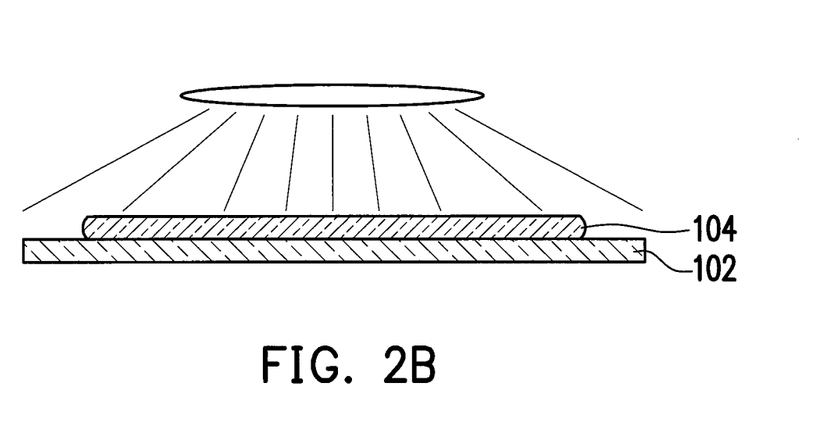

Referring to FIG. 1 and FIG. 2B, Step S12 is performed after the transparent adhesive layer 104 is formed. In Step S12, the entire of the transparent adhesive layer 104 is immediately pre-cured, as shown in FIG. 2B, so as to increase the viscosity of the transparent adhesive layer 104, which implies the flowability of the transparent adhesive layer 104 may be decreased. Here, the pre-curing process employs ultraviolet light with a relatively low dose to irradiate. Specifically, the environment initially employed here is a low-pressure (close to the vacuum state) environment without ultraviolet light, and thus ultraviolet light with a relatively low dose is required in the step of pre-curing to reduce the flowability of the transparent adhesive layer 104. Also, the environment initially employed here requires to isolate ultraviolet light from background. The flowability of the transparent adhesive layer 104 may be decreased through pre-curing, so as to prevent the transparent adhesive layer 104 flowing to other areas of the first panel 102 while the transparent adhesive layer 104 still maintains a sufficient flowability. For example, the viscosity coefficient of the transparent adhesive layer 104 may be raised from 1000~5000 cps (centipoises) to 10000~20000 cps (centipoises) through pre-curing, so as to increase the viscosity of the transparent adhesive layer 104, which implies the flowability of the transparent adhesive layer 104 may be decreased.

Figure 2C:
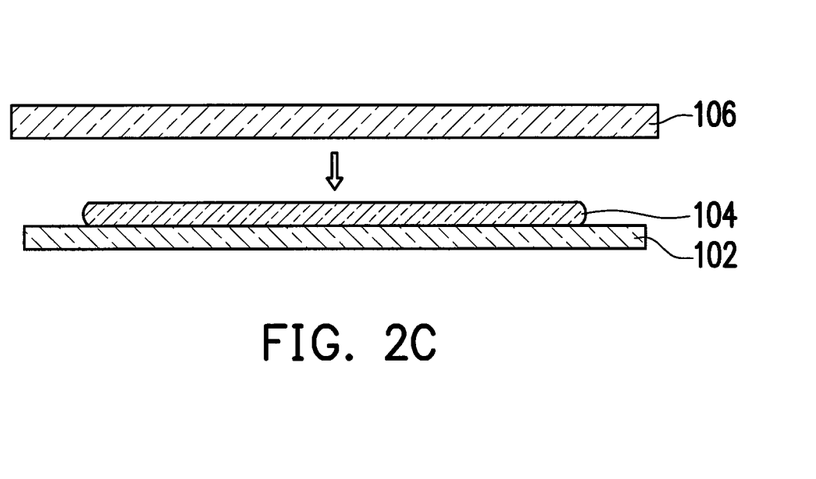

Referring to FIG. 1 and FIG. 2C, Step S13 is performed after the entire of the transparent adhesive layer 104 is pre-cured. In Step S13, a second panel 106 is stacked on the transparent adhesive layer 104, as shown in FIG. 2C. In Step S13, the second panel 106 may be stacked on the transparent adhesive layer 104 under a vacuum environment, so as to reduce the residual air bubbles in the transparent adhesive layer 104. In the embodiment, the first panel 102 may be a liquid crystal panel and the second panel 106 may be a touch panel, in which the touch panel may include a cover plate and a touch module overlapping with the cover plate. In another embodiment, the first panel 102 and the second panel 106 may be two transparent substrates of a touch panel.

Figure 2D:
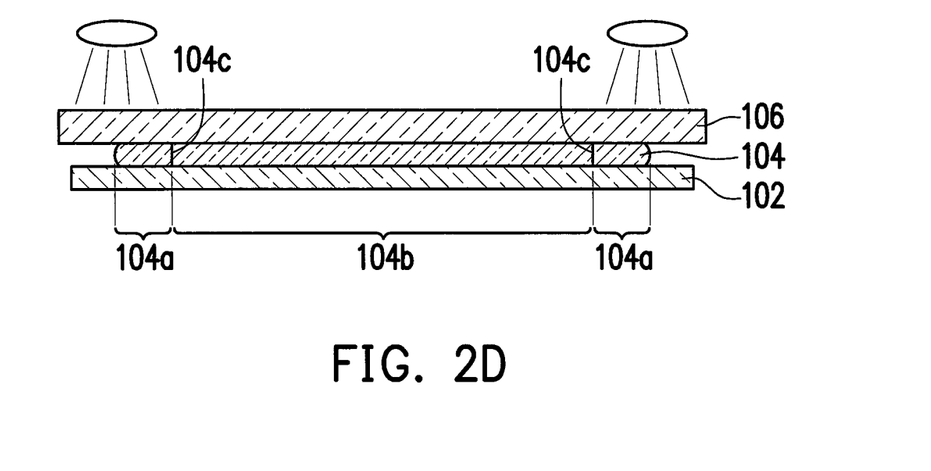

Referring to FIG. 1 and FIG. 2D, Step S14 is performed after the second panel 106 is stacked on the transparent adhesive layer 104. In Step S14, a peripheral portion 104a of the transparent adhesive layer 104 is pre-cured, in which the peripheral portion 104a surrounds a central portion 104b of the transparent adhesive layer 104, as shown in FIG. 2D. Here, the pre-curing process may employ ultraviolet light with a low dose to irradiate, however, such dose is still greater than the irradiation dose for the ultraviolet light employed in the pre-curing process of Step S12. The pre-curing process here may further raise the viscosity coefficient of the peripheral portion 104a of the transparent adhesive layer 104, so as to prevent the transparent adhesive layer 104 overflowing to the non-display regions in the periphery of the first panel 102. In the embodiment, a structural interface 104c exists between the peripheral portion 104a and the central portion 104b due to the difference between the previous curing process and the following curing process.

Figure 2E:
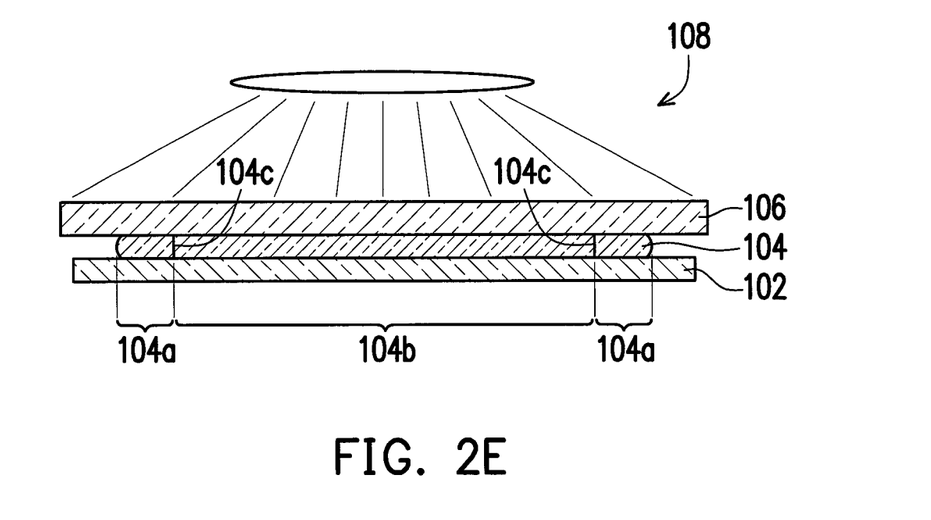

Referring to FIG. 1 and FIG. 2E, Step S15 is performed after the peripheral portion 104a of the transparent adhesive layer 104 is pre-cured. In Step S15, the entire of the transparent adhesive layer 104 is main-cured to increase the viscosity of the transparent adhesive layer 104, such that the second panel 106 is laminated to the first panel 102 through the transparent adhesive layer 104, as shown in FIG. 2E. Here, the main-curing process employs ultraviolet light with a high dose to irradiate, where such dose is greater than the irradiation doses for the ultraviolet lights respectively employed in the pre-curing processes of Step S12 (shown in FIG. 2B) and Step S14 (shown in FIG. 2D). For example, when the transparent adhesive layer 104 utilizes a liquid optical clear adhesive (Model No. 2320) from DuPont, the irradiation dose for the ultraviolet light employed in the pre-curing process of Step S12 (shown in FIG. 2B) is about 3000 milli-joule/square centimeter ($mJ/cm^2$), the irradiation dose for the ultraviolet light employed in the pre-curing process of Step S14 (shown in FIG. 2D) is about 3000 $mJ/cm^2$, and the irradiation dose for the ultraviolet light employed in the main-curing process of Step S15 (shown in FIG. 2E) is about 6000 $mJ/cm^2$.

In another embodiment (not shown), the Step S14 of pre-curing the peripheral portion 104a of the transparent adhesive layer 104 (shown in FIG. 2D) may be omitted, and the Step S15 of main-curing the entire of the transparent adhesive layer 104 (shown in FIG. 2E) may be directly performed.

After the Steps S11 through S15 depicted in FIG. 1 are completed, the first panel 102, the transparent adhesive layer 104 and the second panel 106 are constituted to form a panel assembly 108, as shown in FIG. 2E. The transparent adhesive layer 104 of the embodiment is isotropic and the periphery of the transparent adhesive layer 104 is substantially bared without being surrounded by the conventional dam, which differs from the conventional dam surrounding the transparent adhesive layer to prevent the overflow of the adhesive. Therefore, the areas originally reserved for the conventional dam may be omitted on the periphery of the first panel 102, such that it is facilitated to narrow the non-display regions on the periphery of the first panel 102, thereby narrowing the border design.

Figure 3:
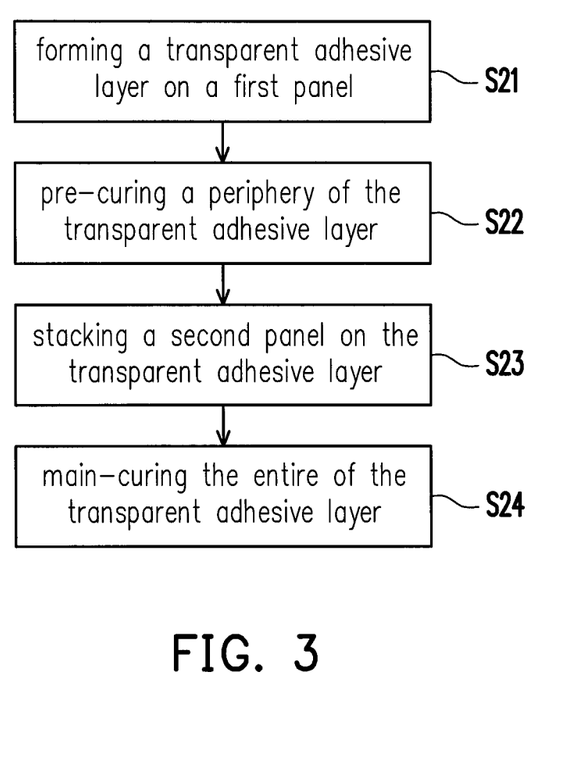
FIG. 3 is a flowchart illustrating a panel laminating method according to another embodiment of the application.
Figure 4A:
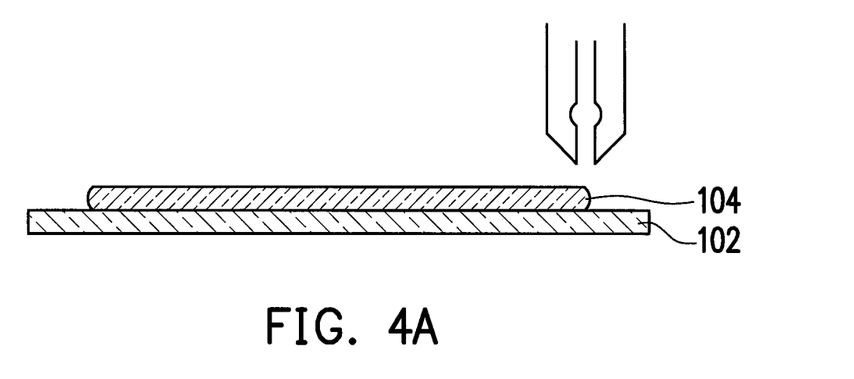
FIG. 4A through FIG. 4D are cross-sectional views sequentially illustrating steps of the panel laminating method depicted in FIG. 3.

FIG. 3 is a flowchart illustrating a panel laminating method according to another embodiment of the application. FIG. 4A through FIG. 4D are cross-sectional views sequentially illustrating steps of the panel laminating method depicted in FIG. 3. Referring to FIG. 3 and FIG. 4A, Step S21 is performed, that is, a transparent adhesive layer 104 is formed on a first panel 102. In Step S21, a liquid optical clear adhesive (LOCA) may be coated on the first panel 102 to form the transparent adhesive layer 104, as shown in FIG. 4A.

Figure 4B:
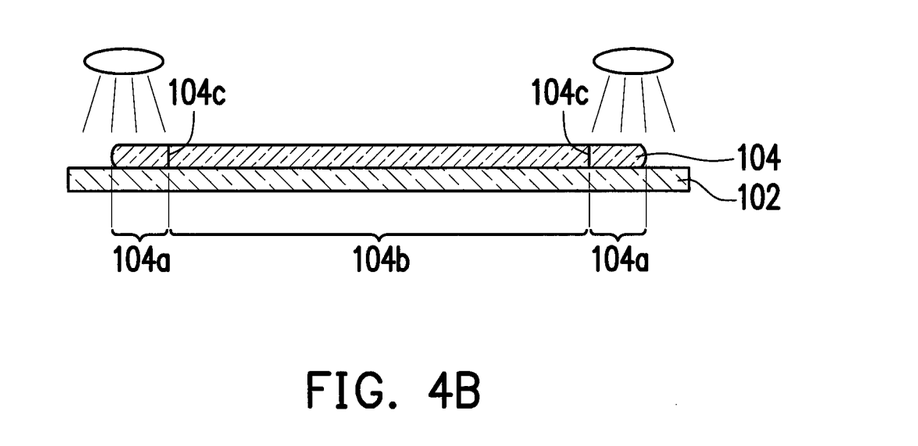

Referring to FIG. 3 and FIG. 4B, Step S22 is performed after the transparent adhesive layer 104 is formed. In Step S22, a peripheral portion 104a of the transparent adhesive layer 104 is immediately pre-cured, in which the peripheral portion 104a surrounds a central portion 104b to increase the viscosity of the peripheral portion 104a of the transparent adhesive layer 104 (as shown in FIG. 4B), which implies the flowability of the peripheral portion 104a of the transparent adhesive layer 104 may be decreased. Here, the pre-curing process employs ultraviolet light with a relatively low dose to irradiate. Specifically, the environment initially employed here is a low-pressure (close to the vacuum state) environment without ultraviolet light, and thus ultraviolet light with a relatively low dose is required in the step of pre-curing to reduce the flowability of the peripheral portion 104a of the transparent adhesive layer 104. Also, the environment initially employed here requires to isolate ultraviolet light from background. The flowability of the transparent adhesive layer 104 may be decreased through pre-curing, so as to prevent the central portion 104b of the transparent adhesive layer 104 flowing to other areas of the first panel 102 while the transparent adhesive layer 104 still maintains a sufficient flowability. For example, the viscosity coefficient of the peripheral portion 104a of the transparent adhesive layer 104 may be raised from 1000~5000 cps (centipoises) to 10000~20000 cps (centipoises) through pre-curing, so as to increase the viscosity of the peripheral portion 104a of the transparent adhesive layer 104, which implies the flowability of the peripheral portion 104a of the transparent adhesive layer 104 may be decreased. In the embodiment, a structural interface 104c exists between the peripheral portion 104a and the central portion 104b due to the difference between the times being cured.

Figure 4C:
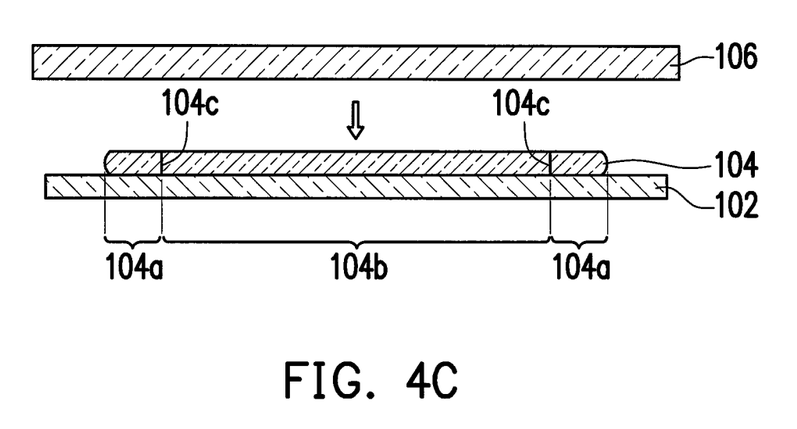

Referring to FIG. 3 and FIG. 4C, Step S23 is performed after the entire of the transparent adhesive layer 104 is pre-cured. In Step S23, a second panel 106 is stacked on the transparent adhesive layer 104, as shown in FIG. 4C. In Step S23, the second panel 106 may be stacked on the transparent adhesive layer 104 under a vacuum environment, so as to reduce the residual air bubbles in the transparent adhesive layer 104. In the embodiment, the first panel 102 may be a liquid crystal panel and the second panel 106 may be a touch panel, in which the touch panel may include a cover plate and a touch module overlapping with the cover plate. In another embodiment, the first panel 102 and the second panel 106 may be two transparent substrates of a touch panel.

Figure 4D:
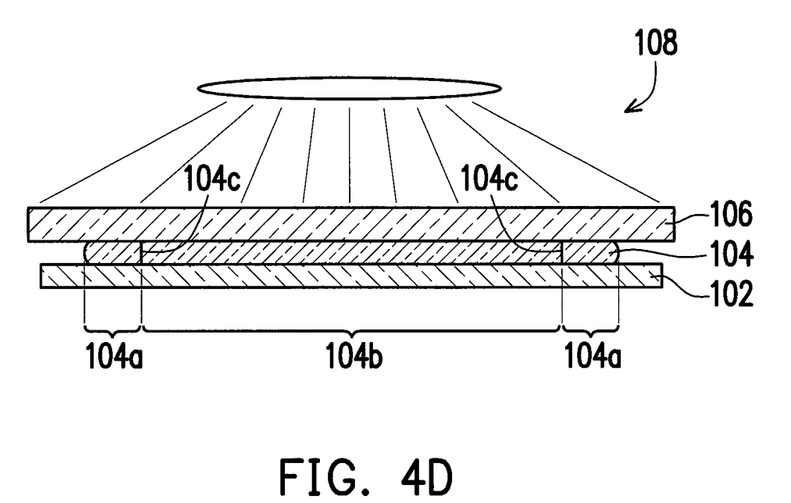

Referring to FIG. 3 and FIG. 4D, Step S24 is performed after the second panel 106 is stacked on the transparent adhesive layer 104. In Step S24, the entire of the transparent adhesive layer 104 (namely, the peripheral portion 104a and the central portion 104b of the transparent adhesive layer 104) is main-cured to increase the viscosity of the transparent adhesive layer 104, such that the second panel 106 is laminated to the first panel 102 through the transparent adhesive layer 104, as shown in FIG. 4D. Here, the main-curing process employs ultraviolet light with a high dose to irradiate, where such dose is greater than the irradiation dose for the ultraviolet light employed in the pre-curing process of Step S22 (shown in FIG. 4B). For example, when the transparent adhesive layer 104 utilizes a liquid optical clear adhesive (Model No. 2320) from DuPont, the irradiation dose for the ultraviolet light employed in the pre-curing process of Step S22 (shown in FIG. 4B) is about 3000 mJ/cm$^2$, and the irradiation dose for the ultraviolet light employed in the main-curing process of Step S24 (shown in FIG. 4D) is about 6000 mJ/cm$^2$.

After the steps S21 through S24 depicted in FIG. 1 are completed, the first panel 102, the transparent adhesive layer 104 and the second panel 106 are constituted to form a panel assembly 108, as shown in FIG. 4D. The transparent adhesive layer 104 of the embodiment is isotropic and the periphery of the transparent adhesive layer 104 is substantially bared without being surrounded by the conventional dam, which differs from the conventional dam surrounding the transparent adhesive layer to prevent the overflow of the paste. Therefore, the areas originally reserved for the conventional dam may be omitted on the periphery of the first panel 102, such that it is facilitated to narrow the non-display regions on the periphery of the first panel 102, thereby narrowing the border design.

Figure 5:
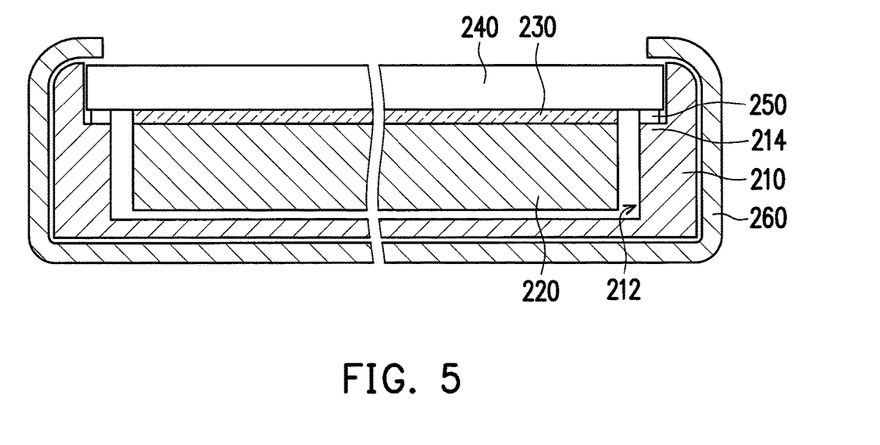
FIG. 5 is a cross-sectional view illustrating an electronic device according to another embodiment of the application.

FIG. 5 is a cross-sectional view illustrating an electronic device according to another embodiment of the application. Referring to FIG. 5, the electronic device 200 of the embodiment may employ the panel laminating method in the afore-described embodiments so as to be fabricated. The electronic device 200 includes a chassis 210, a first panel 220, a transparent adhesive layer 230 and a second panel 240. The chassis 210 has an accommodating space 212. The transparent adhesive layer 230 is disposed on the first panel 220. The second panel 240 is disposed on the transparent adhesive layer 230 to be laminated to the first panel 220 through the transparent adhesive layer 230. The first panel 220 is disposed in the accommodating space 212. The transparent adhesive layer 230 is isotropic, and the periphery of the transparent adhesive layer 230 is substantially bared to the accommodating space 212. In the embodiment, the periphery of the second panel 240 is fixed at the chassis 210, in which the second panel 240 may be laminated to a supporting portion 214 of the chassis 210 through a double-sided adhesive tape 250. Besides, the electronic device 200 further includes a casing 260, and the chassis 210 is fixed at the casing 260. In the embodiment, the first panel 220 may be a liquid crystal panel and the second panel 240 may be a touch panel, in which the touch panel may include a cover plate and a touch module overlapping with the cover plate. In another embodiment, the first panel 220 and the second panel 240 may be two transparent substrates of a touch panel.

To sum up, in the application, after the liquid optical clear adhesive is coated on the first panel to form a transparent adhesive layer, the transparent adhesive layer is immediately irradiated by the ultraviolet light to decrease the flowability of the transparent adhesive layer, such that the conventional dam configured to prevent the overflow of the paste can be omitted, and simultaneously the un-cured transparent adhesive layer can be prevented overflowing to other areas. In addition, the application is capable of reducing the complexity of manufacture through the absence of the conventional dam, which is facilitated to narrow the border design.

Although the application has been described with reference to the above embodiments, the application is not limited to the above embodiments. It is apparent to one of ordinary skill in the art that modifications and variations to the described embodiments may be made without departing from the spirit and scope of the application. Accordingly, the scope of the application will be defined by the attached claims.

What is claimed is:

1. A panel laminating method, comprising:
   forming a transparent adhesive layer on a first panel;
   pre-curing at least a periphery of the transparent adhesive layer, so as to increase a viscosity of the transparent adhesive layer;
   stacking a second panel on the transparent adhesive layer after the periphery of the transparent adhesive layer is pre-cured;
   pre-curing the periphery of the transparent adhesive layer again, for further raising the viscosity of the periphery of the transparent adhesive layer, after the step of stacking the second panel on the transparent adhesive layer; and
   main-curing the entire of the transparent adhesive layer after the periphery of the transparent adhesive layer is pre-cured again, so that the second panel is laminated to the first panel through the transparent adhesive layer,
   wherein the transparent adhesive layer is irradiated by an ultraviolet light with a first dose in the step of pre-curing the transparent adhesive layer before the step of stacking the second panel on the transparent adhesive layer, the periphery of the transparent adhesive layer is irradiated by an ultraviolet light with a second dose in the step of pre-curing the periphery of the transparent adhesive layer after the step of stacking the second panel on the transparent adhesive layer, and the entire transparent adhesive layer is irradiated by an ultraviolet light with a third dose in the step of main-curing the entire of the transparent adhesive layer, where the second dose is greater than the first dose, the third dose is greater than the second dose, and the third dose is about twice of the first dose.

2. The panel laminating method according to claim 1, wherein the first panel is a liquid crystal panel and the second panel is a touch panel.

3. The panel laminating method according to claim 2, wherein the touch panel further comprises a cover plate and a touch module.

4. The panel laminating method according to claim 1, wherein a liquid optical clear adhesive is coated on the first panel to form the transparent adhesive layer, in the step of forming the transparent adhesive layer.

5. The panel laminating method according to claim 1, wherein the second panel is stacked on the transparent adhesive layer in a vacuum environment, in the step of stacking the second panel on the transparent adhesive layer.

6. The panel laminating method according to claim 1, wherein the first panel and the second panel are two transparent substrates of a touch panel.

\* \* \* \* \*